United States Patent

[11] 3,552,296

| [72] | Inventor | William J. Flittie<br>Dallas, Tex. |
|---|---|---|
| [21] | Appl. No. | 760,921 |
| [22] | Filed | Sept. 19, 1968<br>Division of Ser. No. 590,866, Oct. 31,<br>1966, Patent No. 3,427,790. |
| [45] | Patented | Jan. 5, 1971 |
| [73] | Assignee | Henry C. Goldwire<br>Irving, Tex.<br>a fractional part interest |

[54] MEANS FOR ENSILAGING
29 Claims, 25 Drawing Figs.

[52] U.S. Cl. .................................................... 99/235
[51] Int. Cl. ..................................................... A01f 25/16
[50] Field of Search........................................... 206/47;
119/51, 61; 99/235, 235S; 56/473.5, 1, 341, 19,
202, 22

[56] References Cited
UNITED STATES PATENTS
3,058,623 10/1962 Hawk ............................ 99/235

| 3,170,828 | 2/1965 | Irvine ............................ | 99/235 |
| 3,211,303 | 10/1965 | Linde ............................ | 99/235 |
| 3,214,221 | 10/1965 | Finnegan....................... | 99/235 |
| 3,222,853 | 12/1965 | Michael......................... | 56/202 |

Primary Examiner—Robert W. Jenkins
Attorney—H. C. Goldwire

ABSTRACT: A tubular receiver for forming vegetable feedstuff portions into a mass of predetermined shape as they are deposited therein, the mass having peripheral portions sloping upwardly and inwardly relative to the mass and each extending at a respective angle to the bottom face of the mass approaching the angle of repose of the feedstuff portions. A capsule contained in and lining the receiver contains the feedstuff mass. In one embodiment, the capsule has a bottom portion which receives and lies beneath the feedstuff mass, the capsule having a further portion adapted to being placed over the mass and sealingly connected to the bottom portion. The configuration of the mass yielded by the receiver permits the use of a capsule or container of lightweight, readily expendable materials or a capsule of largely preshaped construction and made of heavier, reuseable materials.

INVENTOR.
William J. Flittie
BY
H. C. Goldwire
ATTORNEY

MEANS FOR ENSILAGING

This application is a division of my copending application Ser. No. 590,866 filed on Oct. 31, 1966 and now U.S. Pat. No. 3,427,790, to which reference is made for incorporation hereinto of all pertinent matter thereof not expressly set out below.

This invention relates to agricultural apparatus, and more particularly to improved apparatus for use in ensilaging feedstuff plant material.

It is a major object of the present invention to provide means having utility in the ensiling of feedstuff plants, which means drastically reduce the labor and equipment involved and result in silage of low cost but of excellent quality.

Another object is to provide means useful in ensilaging and feeding feedstuff plants, which means ends the wastage of feed resulting from spoilage of silage upon contact with the air.

A further object is to provide means of the above character which permit feeding silage in a manner providing economically significant benefit to the land on which feedstuff plants were grown and eliminating the expense of appropriating land for feed lot purposes and the concomitant injury to the land.

A still further object is to provide means employable in ensilaging feedstuff plants which makes it possible to provide cattle and the like with more attractive, comfortable, and hygienic feeding conditions.

Still another object is to provide means useful for ensiling feedstuff plants and enabling much more economical feeding of dairy animals and wintering and other maintenance feeding of animals, which means in addition enable a single farmer to fatten cattle or the like more cheaply than can a commercial feed lot.

An additional object is to provide, for use in ensilaging, means which make possible a sharply reduced use of antibiotics and the like in fattening cattle and other animals.

Another object is to provide means of the above character and instrumental in importantly increasing and stabilizing the income and in promoting the security and independence of the operator of a one-man or other relatively small farm while enabling him to place into commerce an increased quantity of high-quality meat animals at lower prices.

A still further object is to provide apparatus useful in effecting the ensilaging of plant portions in a light, comparatively fragile gas barrier while the latter is supported and thereafter depositing the loaded barrier on the ground without rupture.

Still another object is to provide an improved ensilaging container.

Yet another object is to provide apparatus of utility in filling a light and inexpensive capsule of gas-impermeable construction with a chopped feedstuff material to form a mass well adapted for in situ feeding of meat animals therefrom and of a configuration which is contained by a minimum of capsule material, and for depositing the filled capsule on the ground without rupture.

An additional object is to provide an ensilaging apparatus useful in supporting, while it is being filled with relatively finely divided, fresh feedstuff plant material, and in thereafter placing it on the ground without rupture, an ensilaging container with a supported surface too thin to have sufficient strength to resist bursting from weight of the plant material if not widely supported.

Further objects and advantages will be apparent from the specification and claims and from the accompanying drawing.

In pursuing the drawing, it must be understood that the FIGS. are not necessarily to scale, especially as to items such as the angles, thin films, reinforcing strips, etc. shown, and that the preferred embodiment and modifications shown are susceptible of wide variation both as to dimensions and as to relations of their parts.

An important aspect of this invention is that it isolates chopped, fresh plant feedstuff material from air in a housing of minimum cost and preferably in a mass of such shape as to be readily available for consumption of all of its contents by animals, which themselves take the material directly from the mass; at the same time, it eliminates all costs of hauling the feedstuff to the isolating means which are necessary in the case of a silo. For minimum cost of the material of the isolating means, there is employed a thin, flexible, plastic film of thickness and strength so small as to leave it quite incapable of itself supporting any significant part of all the great weight of the mass of feed about which the film constitutes an enclosing capsule. A preferred material for the film is a polyethylene plastic; and many other known plastic films are entirely satisfactory. In addition, a suitable material is a paper sheet waterproofed and made air-impervious by application of a tar-like material, by coating or laminating it with a plastic, etc. Not only is such an isolating means material relatively cheap in itself, but further cost reduction is made possible by employing that material in as thin a film or sheet as is safely useable without risk of serious rupture, thus utilizing a minimum weight of film per square foot. Square footage itself is held to a minimum by shaping the enclosed mass in a configuration which makes possible the transfer of the mass and thin, containing film from a supporting means to the ground without rupture of the film and which configuration also is at or near the shape having, for the volume involved, the least surface area consistent with adequate accessibility of all the mass to feeding livestock.

A given volume of feed has the least surface area, and hence is enclosable by the least square footage of isolating film, where the mass is in the shape of a sphere. Such a shape is unsatisfactory in that the unsupported container could maintain it in such configuration only if it were of extremely heavy and strong (hence expensive) construction; the spherical mass would settle downwardly and outwardly and thus rupture a thin film. This problem is not solved by making the container hemispherical, supported on its flat base; for the hemispherical mass of feed particles is vertical at the ground line and, if unrestrained, downward and outward sliding of the feedstuff particles occurs which bursts a capsule of material thin enough to give economic advantage. Also, aside from the bursting that would occur, the mass would either extend above the feeding height of the animals or would be smaller in volume than frequently is desired; further, not enough animals would at one time have standing room about the mass for eating from it.

The problem of standing room is solved by elongating the mass to a cylinder, but feed in this shape tends to settle and to burst the container in the same manner as a sphere. A half cylinder is the most economically enclosed shape consistent with providing bottom support over all its width and length and yielding sufficient standing room but, like a hemisphere, presents the problem of falling and sliding of material of the feed mass and accompanying rupture of the thin, comparatively delicate and fragile film necessary, for most effective cost saving, for its containment.

Figures 1, 2, 3, 4, 5, 6, 7, 8, 9:
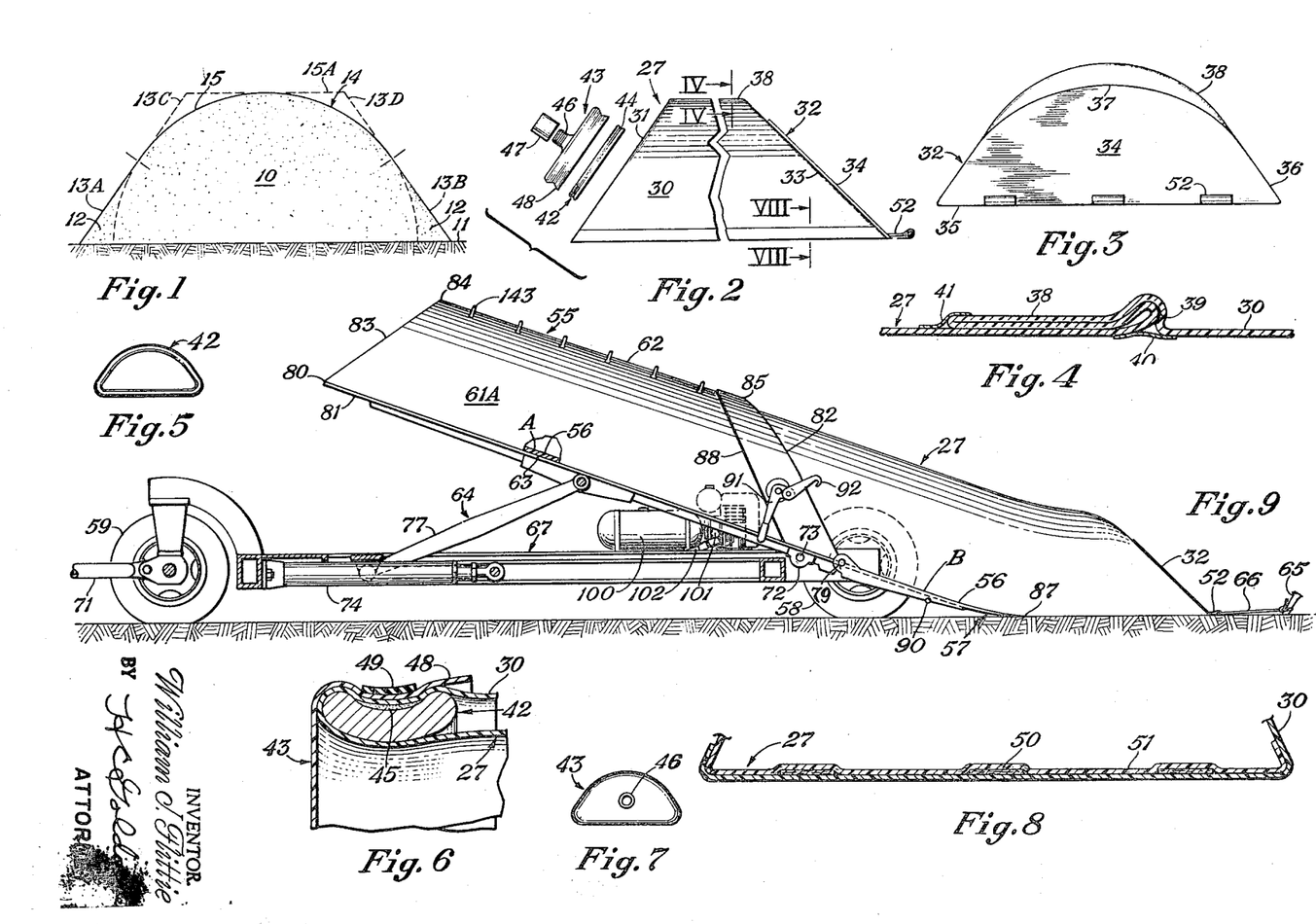
FIG. 1 is an end or cross-sectional view of a mass of chopped, fresh feedstuff plant material diagrammatically illustrating the theoretical basis for ideal shaping of such mass.
FIG. 2 is a side elevational view of an embodiment of the capsule or container.
FIG. 3 is an end view of the capsule showing the rear closure member.
FIG. 4 is a fragmentary, enlarged, cross-sectional view taken as at line IV–IV of FIG. 2.
FIG. 5 is a plan view of the ring.
FIG. 6 is a fragmentary, enlarged, cross-sectional view showing the ring and plate installed for closing the front end of the capsule.
FIG. 7 is a plan view of the front face of the plate.
FIG. 8 is a cross-sectional view of the bottom portion of the capsule taken as at line VIII–VIII of FIG. 2.
FIG. 9 is a side elevational view of the receiver and associated mounting and tilting means, the receiver being in an unloading position.

The ideal solution is found as shown in FIG. 1. The mass of chopped feedstuff 10 is a half cylinder 14 with its bottom resting on a supporting surface 11. At its juncture with the surface 11, the cylindrical sides of the mass 10 are vertical; and for a considerable distance upwardly therefrom, these sides lie at more than the angle of repose of the feed particles, i.e., the maximum angle at which the particles will stand without sliding. Thus, material of the lower portion of the half cylinder 14 will slide downwardly and outwardly, accompanied by related sliding and settling of the material thereabove; and this sliding and falling will reduce the volume-containing capacity of and rupture a thin film closely enclosing the feed. Such sliding and rupture are avoided by adding to each of the sides of the half cylinder 14 further feed 12 which fills in a volume laterally defined by the lower part of the half cylinder walls and a plane 13A or 13B which is tangent with the half cylinder 14 and which lies at the angle of repose of the chopped feedstuff. Thus, none of this added material 12 will slide; nor will the material located above it, which material at all locations lies at less than its angle of repose. In such configuration, a film enclosing the mass 10, 12 need be of only nominal strength; for it is supported by (and transfers all downward forces of the feed to) the supporting surface 11, and there are no other forces on it beyond those imposed by its own, scant weight. A very thin, inexpensive film therefore can be employed.

As long as the fundamental concept stated above and reasons underlying it are not lost sight of in shaping the feedstuff mass 10, considerable variation in shape can be effected while obtaining entirely satisfactory results. For example, the angle of repose of chopped feedstuffs varies considerably, depending on factors such as the kind of plant, the fineness of the chop, the water content of the particular plants when chopped, the impact or other packing force exerted on the wet particles when they enter the mass, etc. For this reason, no exact angle of repose can be stated for all feeds, or for even any one feed, under all circumstances encountered in practice. As will be more fully discussed, the invention provides and utilizes means for constraining a thin film to form a container with sidewalls of the height of the added feed 12 and in the planes of the tangent portions 13A, 13B defined above; a flat bottom connecting the lower edges or borders of the sidewalls 13A, 13B; and a top which lies in the arc 15 of the half cylinder 14 remaining above the points of tangency of the sidewall planes with the half cylinder. This constraint is imposed while the mass of feedstuff 10 is being deposited in the container and hence imposes the above-described configuration also on the feedstuff mass. For the reason stated above, it is desirable to so fashion this means that the sidewalls of the container (and of the mass therein) lie at a safe and conservative angle somewhat less than the angle of repose of the chopped feedstuff. As an addition and even partial alternative to the above-described constraint, there is provided a loose, empty excess of the film at the top of the mass 10 (as later shown and described); upon the mass being moved and there being some lateral and downward displacement of any of the feed, the film adjusts and accommodates itself to the slightly altered configuration by some of the slack in the loose material being taken up, and bursting is avoided. To this extent, the sides of the mass 10 can therefore be inclined at slightly more than the angle of repose of a particular feed being handled without rendering the operation ineffective. Also, it sometimes is easier or cheaper to construct equipment, for obtaining the desired configuration of the mass, with a flap top, rather than the cylindrical top 15 of the ideal configuration. This is readily effected by extending the sidewalls 13A, 13B further upwardly, as shown in broken line at 13C, 13D, and connecting their upper edges or borders by a flat top wall, shown in broken line at 15A and at the height of the top of the half cylinder 14. Other heights, of course, are acceptable. Not a prohibitive amount of volume-enclosing ability of a given square footage of the film is lost by this or similar modifications later discussed, in which it is essential to provide sides of the mass approximating the angle of repose of the chopped, fresh feedstuff.

As concerns the container or capsule (described in detail in later paragraphs), its dimensions are varied as required to suit different harvesting and feeding conditions. Each container, however, is made of such length, height, and breadth that its fermented contents, namely silage, are consumable, when the container is opened, by the animals available to eat it before spoilage significantly reduces the palatability and nutritional value of the silage; in order that all the feed therein may be reached and eaten, it is of a width approximately twice the feeding reach, from its front feet, of a representative one of the animals to be fed therefrom. A container is opened, to permit the animals to consume its contents in situ, at a desired time after fermentation of the feed; and this is accomplished by simply cutting or tearing the thin film forming the container to expose the feed. The containers are opened at a rate not greater than that at which all the silage then exposed to air will be consumed by the animals before another container is opened.

FIG. 2 shows a capsule or container 27 for ensilaging a fresh, chopped feedstuff plant material, which container has a tubular sidewall 30 made of a substantially gas-impervious material such as described; a preferred material is a polyethylene film of 4—6 mils thickness. A thinner (therefore less costly) film sheet is useable; a thicker one, while useable, is more expensive. The sidewall 30 has an open front end 31, through which (as will appear more clearly in later-described FIGS. of the drawing) the chopped feed can be received into it, and a rear end firmly attached to and closed by a closure member 32.

The closure member 32 is of a gas-impervious material a plurality of times thicker, heavier, and less flexible than the sidewall material; it preferably is made of a plate which may be of the same material as that of the sidewall 30, but of higher density. To perform its functions properly, rigidity or semirigidity is necessary in the closure member 32. This is provided by its greater density and thickness, which also gives it an added weight, both being of a utility which will become apparent when considering its cooperation with the receiver (to be described), where the weight must be sufficient to appreciably urge straightening of the tubular sidewall 30 when suspended by its front end 31. The closure member front face 33 is identical with its rear face 34 which, as shown in FIG. 3, has a flat lower border 35 and side borders 36 extending upwardly in mutual convergence and at an angle to the lower border approximating the angle of repose of chopped, fresh feedstuff plant material. It will be realized that, since this angle varies with different materials, no attempt is made in the drawing or specification to illustrate or name any exact angle of repose; however, an angle of about 55° is employed in a preferred embodiment and is satisfactory for use with a number of chopped feeds loaded into the capsule 27 in the manner which will be described hereinafter. It is important to note that, depending on the plants to be ensilaged, the fineness of chop, and other factors, either a smaller or larger angle may be employed; and this is to be remembered wherever the term "angle of repose" is mentioned herein as setting or proximating the angle of any part of the apparatus.

The side borders 36 of the closure member 32, in the preferred embodiment, extend upwardly until (as described in connection with FIG. 1) they come into tangency with a circle the diameter of which lies on the lower border 35; a top border 37 connects the side borders and is formed by the arc of the circle remaining above the points of tangency. The dimensions of the closure member 32 in the planes of its two faces 33, 34 are such that the member fits slidably within a receiver (to be described) and conforms to the shape of the receiver cross section. Thus, if the receiver cross section is not shaped to fit the closure member shape described above, the closure member shape must be varied accordingly. In any event, for ready sliding therein, the closure member 32 is of slightly smaller dimensions than and of closely similar shape to the cross section of the receiver with which it is used.

As shown in FIGS. 2 and 3, the tubular sidewall 30 has sufficient material (shown unrestrained) to be expansible to extend above and hence to have a cross-sectional area appreciably larger than the face area of the closure member 32. The extra material 38 extends the full length of the capsule 27 at its top side and preferably is lightly closed off from the rest of the capsule by suitable means. Such means is a narrow strip of adhesive 39 (FIG. 4) attaching together the borders of the folded extra material 38, where it joins the remainder of the capsule 27, and closing it off. Another form of this means employable as an alternative or in addition to the adhesive 39 is a pressure-sensitive tape 40 adhered to the capsule inner surface on either side of and closing off the extra portion 38. In any event, the means utilized to close off this portion must only lightly hold together the closed-off extra material 38 in order that it (when the capsule is filled) may readily yield to free the excess material 38 and let it move downwardly and outwardly upon sliding of any feedstuff along the sides (including the ends) of the feedstuff mass in the capsule. To hold the extra material 38 in folded position relative to the rest of the sidewall before such time, more pressure-sensitive tape, etc. may be employed as shown at 41 in FIG. 4. Even without the excess material 38, the capsule 27 must be expansible to a cross-sectional area at least slightly larger than that of the receiver with which it is to be used.

Means are provided for closing the tubular sidewall open end 31 (FIG. 2) after the capsule 27 is filled, to a desired extent, with chopped, fresh feedstuff plant portions, this to prevent entry of air into the capsule and spoilage of the feed. In the preferred embodiment, a rigid ring 42 (FIGS. 2, 5, 6) is preferably of the general shape of the rear closure member 32 and has, at its peripheral face, a peripheral groove 44 preferably containing on its wall a pressure-sensitive adhesive 45 (FIG. 6). The ring 42 may be made of steel or other strong, rigid material. While not shown, a paper strip or equivalent may be employed to cover the adhesive 45 until the ring 42 is ready for use. To close the container 27 after it is filled, there is brought into contact with the walls and bottom of the groove 44 a portion of the tubular sidewall 30 having a surface area extending around all the periphery of the tubular sidewall, either on the interior or exterior of the latter. Preferably, as shown in FIG. 6, the ring 42 is placed around the loose, unfilled material of the sidewall 30 remaining at the front of the capsule 27, and some of this material then is folded back around the exterior of the ring and pressed into the groove 44, the adhesive 45 of which urges retention of the sidewall material in place.

Cooperating with the ring 42 is a plate 43 (FIGS. 2, 6, 7) made of, for example, a semirigid, high density, gas-impervious plastic and provided with an opening therethrough adapted, as by a cylindrical, threaded portion 46 encircling the opening, for receiving a one-way check valve 47. The plate 43 has a peripheral flange 48 sized to snap over, by elastic yielding of the plate material, the material of the sidewall 30 covering the peripheral face of the ring 42 and having an inner surface shaped to complement that face and enter into the ring groove 44 over the sidewall material. Means such as a tightenable wire, cable, or band 49 are employed to encircle and lie within the ring groove 44 and to compress the flange 48 tightly toward the ring 42, thereby bringing the peripheral surface area of the capsule 27 held by the adhesive 45 in close, fixed contact with the ring and effecting a substantially airtight seal of the capsule. The check valve 47 preferably is threaded to engage and close off the plate cylindrical portion 46 and is of such construction as to be closed when pressures at each side of it are in equilibrium and to open to allow escape of gases in the container 27 under only a little more than atmospheric pressures. The valve 47 therefore provides a channel of one-way communication extending from the interior to the exterior of the capsule 27.

The dimensions of the ring 42 and plate 43 are such that, when mated as in FIG. 6, their largest dimension is not greater than the corresponding dimension of the closure member 32, the ring and plate providing an overall shape corresponding to that of the latter. Such dimensioning is important to make the just described means for closing the tubular sidewall open, forward end 31 freely moveable, without binding, within and longitudinally of the receiver (to be described). Actually, the ring 42 and plate 43 preferably retain the general shape of the rear end closure member 32, but are of somewhat smaller plan view dimensions, this to reduce the required quantities of the heavier and more expensive materials of which they both are made. Preservation of the shape mentioned, in the front end closure means, however, is of importance in that it facilitates making a closure of the capsule front end 31 which is symmetrically related to the cross-sectional shape of the filled capsule 27 and thus tends to distribute and transfer evenly to material of the sidewall 30 any forwardly directed forces imposed on it by forward falling of some of the feed, if this should occur; in addition, it minimizes the amount of material of the sidewall 30 needed for cooperation with the ring 42 and plate 43 for closing the capsule 27.

The means for providing groundward motion of the capsule, later described in full, comprise in part at least one reinforcing element, such as 50 (FIG. 8) extending substantially the length of the tubular sidewall 30. As shown, the reinforcing element or elements 50 are attached to the bottom portion of the tubular capsule 27; similar, additional elements may be provided on the sides, if and as required by any particular usage. Each element 50 is cemented or otherwise firmly affixed to the inner surface of the capsule material; or, as shown, a construction of the capsule 27 is employed in which the capsule bottom wall is made of double thickness by overlapping and cementing together the material of which it is made, and reinforcing elements 50 are readily positioned within the overlap 51 and secured by the same cement bonding the two thicknesses of material of the tubular sidewall 30 thus produced. The overlapped material 51 increases strength of the capsule bottom, as do the reinforcing elements 50; and these reinforcing strips 50, when adapted for attachment to a pulling force as by connecting means such as rings or loops 52 (FIGS. 2, 3) make readily possible the application to the capsule 27 of an external force tending to slide it rearwardly on a surface on which it is supported. Each reinforcing element 50 is made of paper, parallel plastic or glass fibers, or other relatively strong material.

The apparatus for ensilaging a vegetable feedstuff material, for example, fresh milo maize seedheads and other desired portions from the standing plants, further comprises means for supporting the capsule 27 in position for receiving chopped plant portions as they are expelled from a means severing feed from the plants or (where the fresh plants lie cut) picking them off the ground.

FIG. 9 shows means such as called for above, which means includes structure 55 forming an upwardly facing surface 56 for supporting the bottom side of the capsule 27 above the ground; this structure 55 in turn has a rear end, formed by the rear edge of a door 57 which is positionable in contiguity with the ground. It will be seen that the surface 56 is in contact with the capsule 27 along most of the capsule length (i.e., all of that length which becomes filled with the chopped feed) during deposition of the feedstuff therein. At initiation of transfer of the capsule 27 from the surface 56 to the ground, this surface is in a tilted attitude, for example as shown in FIG. 9, in which the capsule longitudinal axis is substantially displaced from the vertical; as the capsule moves to the ground, this axis becomes horizontal. Wheels 58, 59 are disposed in supporting relation to and enable motion of the structure 55, which has a chassis 67.

Figures 10, 11, 12, 13:
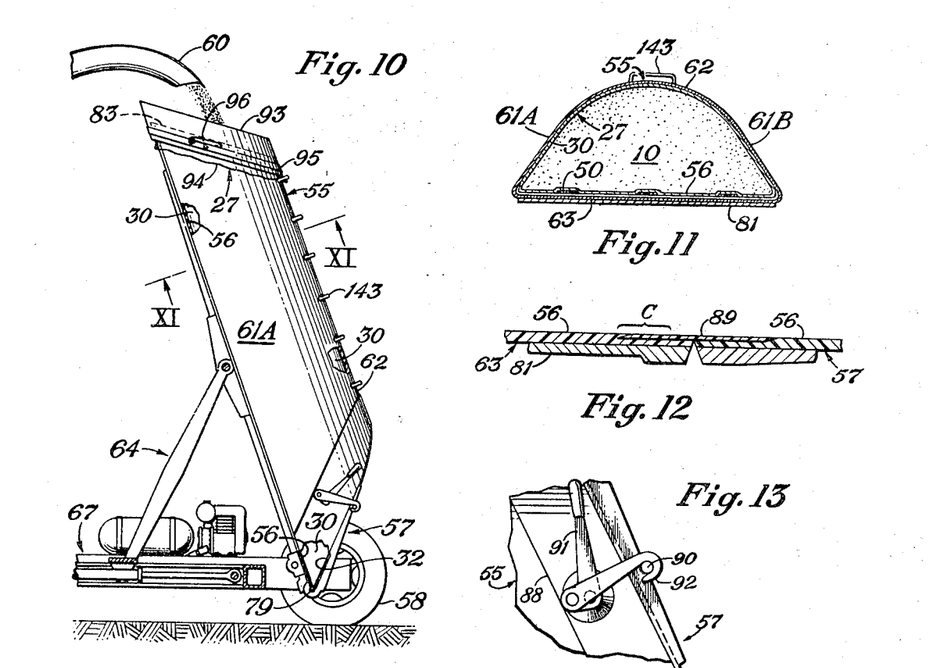
FIG. 10 is a view similar to FIG. 9, but with the receiver tilted to a greater angle and with the feed discharge spout in place.
FIG. 11 is a cross-sectional view taken as at line XI–XI of FIG. 10.
FIG. 12 is a fragmentary, enlarged, diagrammatic view of a mode of effecting smooth juncture between the receiver bottom wall and door upper surfaces.
FIG. 13 is a fragmentary enlarged view of an upper, rear corner of the receiver showing the door locked in its closed position.

The feed discharged from the spout 60 (FIG. 10) of a conventional severing and chopping device is impelled by and entrained in an airflow which is directed by the discharge spout into the capsule 27, which it enters with considerable kinetic energy. The means of FIG. 9, shown in FIG. 10 in one possible filling position, support and position the capsule or container 27 for receiving the airflow and entrained, chopped feedstuff material, meanwhile constraining the container 27, by means of walls of the receiver or structure 55 in which the container is mounted, against outward forces and to a configuration characterized (with added reference to FIG. 9) by a flat, elongated base conforming to the supporting surface 56, and sides connected by a top surface conforming to the shape of the receiver sidewalls 61A, 61B and top 62. The receiver sidewalls 61A, 61B form an opposing pair which slope inwardly and upwardly from the lateral borders of and each lie at an angle to the receiver bottom wall 63 (hence, to the base of the feedstuff mass 10 built up within the container 27) that approximates and preferably is somewhat less than the angle of repose of the feedstuff received. As shown in FIG. 10, the capsule rear end closure member 32 lies flat against the closed door 57, and the base of the feedstuff mass 10 (FIG. 11) in capsule 27 with sidewall 30 is parallel with the flat, lower border 35 (FIG. 3) of the closure member 32, which slidably fits in the receiver 55. As shown in FIG. 9, the supporting means provided by the receiver 55 is positionable for effecting sliding of the filled capsule 27 directly to the ground, after (as in FIG. 10) supporting it in spaced relation with the ground during its filling. As shown at 64, there are provided means for tilting the receiver 55 for accomplishing the transfer of the capsule 27 from its supporting and positioning means 55 to the ground while, as will be seen, the height of the sides of the mass 10 remain roughly unchanged, thus avoiding imposition of serious bursting forces on the capsule 27. The transfer means may also include means such as a stake 65 and ropes 66 (FIG. 9) which place a pulling force on the one or more rings or loops 52. As shown in FIG. 9, means such as bored lugs 72 are provided on the rear end of the receiver 55 for pivotally mounting it on the chassis 67. The receiver 55 is at its rear end encircled by and securely and rigidly attached to a heavy ring 88 bearing the lugs 72, one on each side of the receiver, which journal laterally extending shafts 73 mounted on the chassis 67. Also mounted on the chassis 67 are the means 64 for pivoting the receiver 55 comprising, for example, a hydraulic actuator 74. Movement of the piston of the actuator 74 results in actuation of a linkage 77, which may be of any conventional or desired form, to raise the receiver 55, as shown in FIG. 10, to one of its loading positions.

The means for cutting the desired quantity of feedstuff plant material and depositing the same in the capsule 27 through its front end opening, while the capsule is supported and moved along the ground by the transport means 67, is preferably a field chopper drawn by the same tractor, etc. drawing the chassis 67. The chopper may be of any conventional or desired construction but preferably chops the severed feedstuff finer than usual in order that, being wet, it will tend to pack and cling together somewhat upon experiencing the impact which brings it to rest within the capsule 27, thus increasing its angle of repose and facilitating its forming a mass closely conforming to the bottom, top, and sides of the configuration in which the capsule 27 is constrained by the receiver 55. Also, the finer cut is of significance in that it promotes faster and more thorough and uniform fermentation; and seeds in the feed are better ingested if their hulls are crushed. The chopper has the usual discharge duct, extended as necessary, with a spout 60 (FIG. 10) positioned to direct the chopped feed, entrained in a vigorous airflow, into the capsule 27 mounted within the receiver 55.

To return to the structure 55 (FIG. 9) which defines and provides the elongated supporting surface 56 mounted on the transport means 67, this structure has an elongated portion A which is formed by the receiver bottom wall 63 and which defines the major part of the supporting surface 56, the rear end of this longer portion A being formed by the bottom wall rear edge (in register with the door hinge 79). As noted, the structure longer portion A is pivotable, in the vicinity of its rear end, relative to the transport means 67 and about a transverse axis 73 lying forwardly of the structure end portion B formed by the door 57. This end portion B itself forms a lesser, but important, part of the supporting surface 56 and is pivotable between a first position in which, as shown in FIG. 9, it is in contiguity with the ground and a second position (FIG. 10) in which it extends upwardly to block motion of the capsule 27 along the supporting surface longer portion A. In the embodiment shown, and in any embodiment in which the capsule 27 slides along the supporting surface 56 in being transferred therefrom to the ground, it is important that the supporting surface 56 be smooth throughout, in order to avoid tearing the bottom of the capsule 27 and to reduce friction between the supporting surface, formed by the receiver bottom wall 63 and door 57, insofar as possible. The same applies, if to somewhat less degree, to the receiver sidewalls 61A, 61B (FIG. 11) and even to some extent to the top wall 62. It is the supporting surface 56 (FIG. 9), however, which imposes the greatest amount of frictional load on the capsule 27. This surface 56, as well as the inner surface of the sidewalls 61A, 61B and top wall 62, may be the very smoothly finished surface of a glass fiber and resin composite of which the receiver 55 and its door 57 are made, or these parts may be made of (or lined with) a metal with smoothly finished inner surface. To promote sliding of the capsule 27, lubricants may be employed, and the inner surface of the receiver bottom wall 63 may be provided with shallow, rounded longitudinal channels into which such lubricants may be supplied. Another and very effective means of reducing friction to a minimum is to line the receiver inner surface of the receiver 55, or at least the inner surfaces of the bottom wall 63 and door 57, with an inherently slick and tough material such as one of the poly(tetrafluoroethylene) plastics widely known as "Teflon."

To describe the receiver 55 in further detail, this tubular structure must contain and bear the weight of the relatively wet and quite heavy, chopped feed and hence must be of strong construction. To give needed strength at its bottom wall 63 (which extends the length of the receiver 55), this wall may be made of thicker, heavier material or may, as shown, be reinforced by a sturdy plate 81 which, for example, has longitudinally extending stiffeners and is made of steel. The plate 81 is rigidly attached to and preferably covers all of the bottom surface of the receiver 55. To this plate 81 is attached the linkage 77 of the means 64 for pivoting the receiver 55 between its unloading position (FIG. 9), in which (with the door 57 in its second position) the substantially flat inner surface of the receiver bottom wall 63 and inner surface of the door 57 form a substantially continuous, sloping surface extending from the interior of the receiver 55 to the ground, and its loading position (FIG. 10) in which the receiver front end is raised to increase further the slope of the bottom wall 63. To prevent binding or increase in friction between the capsule 27 and receiver 55 in the region where the sidewalls 61A, 61B (FIG. 11) meet the bottom wall 63, it is desirable to break the angularity of wall intersection slightly by forming these intersections on a small radius.

Inclined inwardly and upwardly from the lateral borders of the bottom wall 63 at an angle to the bottom wall approximating the angle of repose of the chopped plant material, the pair of opposed sidewalls 61A, 61B have respective rear edges such as 82 (FIG. 9), each of which joins the bottom wall rear edge and slopes forwardly and upwardly from the bottom wall at a slope best always less than the feedstuff angle of repose. Similarly, the sidewall front edges 83 extend at a rearward slope to the planar bottom wall 63, and from the front edge 80 thereof, at an angle which approximates the angle of repose of the feed. The top borders of the two sidewalls 61A, 61B (FIG. 11) are of equal height and preferably are located, at any point along the length of the receiver 55, by employing the principles discussed in connection with FIG. 1.

In the embodiment described, the upper and bottom walls 62, 63 are rearwardly divergent from each other, as are the two sidewalls 61A, 61B, a total divergence of around 1 or 2 inches being sufficient if the receiver is, for example, 10 feet long. The top wall forward edge 84 (FIG. 9) joins the sidewall front edges 83 and cooperates with them and the bottom wall forward edge 80 to form a rim defining the receiver front end and the opening thereinto. The top wall rear edge 85 (FIG. 9) similarly cooperates with the sidewall rear edges 82 and bottom wall rear edge to form a rim defining the rear end of the tubular portion of the receiver 55, and its rear end opening from which the filled capsule 27 issues.

The door 57, as seen in side view in FIG. 9, may be flat, but preferably is made concave adjacent its upper or free edge 87 (which edge of course is downward when the door is fully opened), and a corresponding curvature is given to the sidewall rear edges 82 in order that the door 57, when pivoted to its first position, will snugly close the receiver rear opening. In its second position, the door 57 extends downwardly and rearwardly from the receiver 55 and is pivoted to a position in which its upper edge 87 comes to lie below the remainder of the door and to rest on the ground.

The means for pivotably mounting the door 57 relative to the receiver 55 is of any convenient form which leaves the inner surfaces 56 of the receiver bottom wall 63 and door 57 substantially continuous with each other, thereby avoiding tearing of the capsule 27 when it is unloaded, and which permits pivoting of the door between its above-mentioned first and second positions. A construction ensuring a satisfactorily smooth juncture between the bottom wall 63 and door 57 is shown in FIG. 12 and is used in connection with a door-mounting arrangement of any conventional kind in which the pivot line is flush with the inner surface 56. At and near its rear edge, the bottom wall 63 is reduced in thickness, a similar reduction being made near and at the front edge of the door 57. These two reduced-thickness portions, which extend the width of the bottom wall, are restored to their original thicknesses by covering them with a piece 89 of strong, pliable, slick material such as the plastic known as "Teflon." The plastic piece 89 is preferably feather-edged at its rear end, and a feather edge may be formed in the inner surface 56 of the bottom wall 63 to overlie the other end of the piece 89. This piece 89 is rigidly fixed, in an area C at its front end, to the bottom wall 63; the rest of it is free to move and bend upon pivoting of the door 57 relative to the bottom wall 63.

Any desired means is employed for locking the door 57 in its first, closed position. An exemplary means is shown, in FIGS. 9, 13, as comprising a stud pin 90 in each outer edge of the door 57. A toggle 91 mounted on the receiver reinforcing ring 88 is movable for pulling forwardly a piece with a hooked end 92 engaging the pin 90 to thus clamp the door 57 tightly shut; or the toggle 91 is moved in the reverse direction to loosen the hook 92 on the pin 90 and allow it to be disengaged therefrom for releasing the door 57.

To permit deposition of chopped plant material in the capsule 27, means are provided for rigidly fixing its front end opening in coincidence with the front end opening of the receiver 55. This means comprises a flexible sleeve 93 (FIG. 10) which is slipped over and into an encircling relation to excess material 94 of the capsule 27 defining the capsule open end and turned back, in the manner of a cuff, over the front end rim 83 of the receiver 55 to place the material 94 in outwardly encircling, rearwardly extending relation to the receiver front end opening defined by the rim 83. For allowing complete filling of the receiver 55 without spilling, the sleeve 92 preferably extends somewhat forwardly of the receiver 55. About the sleeve 93 extends a clamping ring 95 connected to and tightenable by a toggle 96 to clamp the sleeve 93, and underlying material of the capsule 27, securely on the front end of the receiver 55. The sleeve 93, of course, could be omitted and the cuffed material 94 of capsule 27 held by the clamp ring 95 alone.

The just-described means for holding the front end of the capsule 27 also serves to hold the flexible, tubular sidewall 30 of the capsule, when placed in the receiver 55 and clamped as described, in a configuration generally corresponding to the interior shape of the receiver. With the receiver 55 elevated as for example, in FIG. 10, the weight of the material of the sidewall 30 and the added weight of the rear end closure member 32 tend to pull the sidewall straight; and the receiver front rim 83 by which the capsule is suspended and the rear end closure member 32 urge the capsule to seek the same shape as the interior of the receiver. Beyond this, airflow from the severing means spout 60 inflates the capsule 27 and pushes its thin, flexible sidewall material against the walls of the receiver 55. It is to be stressed that the dimensions of the capsule 27 are somewhat greater than the interior dimensions of the receiver 55, this in order that significant stretching and bursting forces will not be placed on the capsule as it is filled.

Figures 14, 15:
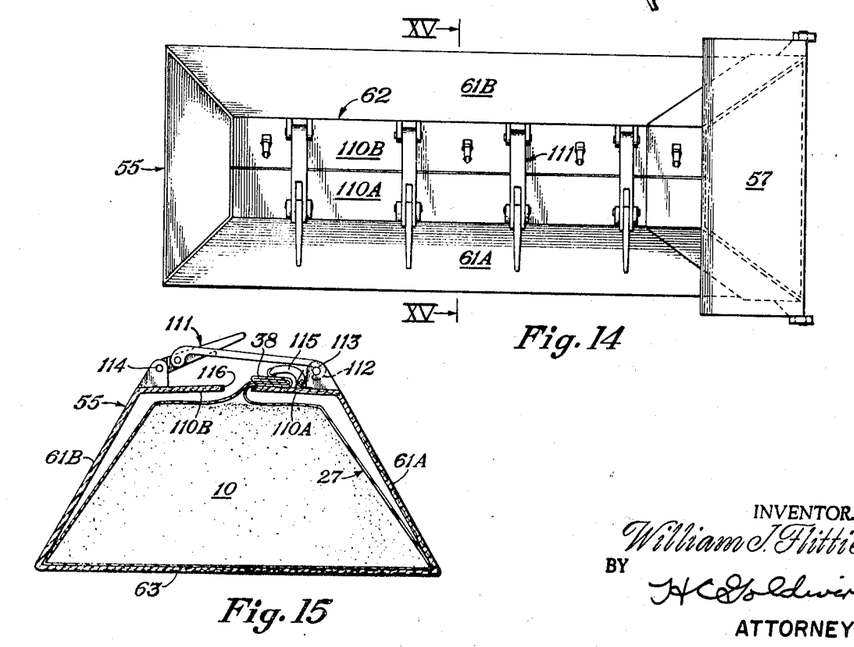
FIG. 14 is a plan view of a modification of the receiver.
FIG. 15 is a cross-sectional view taken as at line XV–XV of FIG. 14.

The tubular receiver, as so far described, has walls 61A, 61B, 62, 63 (FIG. 11), each of which preferably is made in one, continuous piece as to itself and with the other walls. In an important modification of the invention, however, the top wall 62 (FIG. 14) is divided along its length into two, separable portions 110A, 110B, the confronting edges of which portions are formed to provide mating surfaces which are separable by outwardly moving the upper borders of the two sidewalls 61A, 61B relative to each other. Such movement preferably is made possible by constructing the receiver 55 in one piece and of a resilient material, such as steel or a glass fiber and resin composite or laminate, the construction being such that the receiver, with no outside forces imposed on it, stands with its top wall mating edges spaced from each other, as shown in FIG. 15, the construction being springy enough to allow elastic yielding of the receiver material for bringing the mating edges of the top wall portions 110A, 110B together as in FIG. 14. Alternatively, the construction may be such that the mating edges lie together in the position shown in FIG. 14 until forcibly sprung apart to provide a gap therebetween as shown in FIG. 15; or a hinged construction may be employed to allow movement of the mating edges of the separable portions 110A, 110B relative to each other for opening and closing the gap. Care must be exercised to so locate or cover any hinging employed as to not present a sharp or rough surface that will be in contact with the capsule during its sliding egress from the receiver 55.

Means are provided for making the receiver 55 rigid by locking the mating surfaces of the top wall separable portions 110A, 110B in their closed, mated position. Any means which locks the mating edges in close, mutual contact or, as will be described, to clamp a portion 38 (FIG. 15) of the capsule 27 between them, is satisfactory. A preferred means is toggles 111 pivotably mounted on one 110B of the separable portions and each having at its free end a hook 112 for engaging a pin 113 on the other separable portion 110A. When the toggle 111 is actuated in one direction, the edges of the separable portions 110A, 110B are locked in mating relation as in FIG. 14; swung to its other position, it allows these portions 110A, 110B to spread as in FIG. 15. In this latter position, the toggle 111 serves as a rigid connection between the separable portions 110A, 110B which prevents any further outward travel of the upper borders or edges of the sidewalls 61A, 61B relative to each other. When desired, the sidewalls 61A, 61B can be spring inwardly toward each to other sufficiently to allow disengagement of the toggle hook 112 from the pin 113, whereupon the toggle can be pivoted on its pivot 114 to provide unimpeded access to the gap which then opens into the receiver interior.

A large part 38 of the excess material of the capsule 27 extends through the gap, in the arrangement shown in FIG. 15, and is held in place on one of the receiver top wall separable portions 110A or 110B by suitable means such as swinging, spring clamps 115 actuatable for holding or releasing the excess material 38 and located on the upper surface of the top wall 62. A longitudinal portion 38 of the flexible, tubular sidewall of the capsule 27 thus is held in place after the capsule is placed in the receiver and before the toggles 111 are actuated to mate or close the edges of the separable portions 110A, 110B and thus clamp the material of the capsule extending therebetween. In so clamping this material, the mating edges form a means for closing off the longitudinally extending capsule excess portion 38 from the capsule interior, which portion is opposite and extending longitudinally of the capsule base, in the position in which it is mounted in the receiver 55. By so clamping and shutting off the excess material 38, that material is temporarily prevented from being filled with the feedstuff particles when the, entrained in an airflow or otherwise impelled, are directed into the capsule 27. In order that they may clamp material of the capsule 27 firmly but without damage, the mating edges preferably are faced, as shown at 116, with rubber or other yieldable material.

Many modifications of the invention are possible while remaining within its concept and principles, and the brief examples noted below are only several out of the large number possible in the areas touched upon, as well as in other areas.

Figure 16:
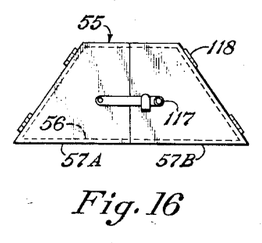
FIG. 16 is a rear view of another modification of the receiver.
Figure 17:
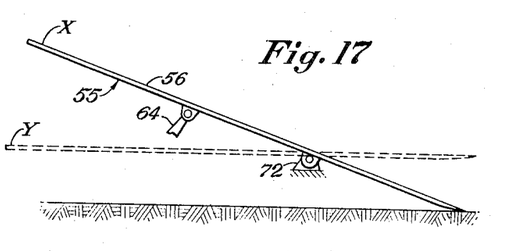
FIG. 17 is a diagrammatic, side elevational view of the bottom wall of the receiver of FIG. 16.

In FIG. 16, there is shown a modification in which the receiver has a rear end closure in form of two laterally swinging doors 57A, 57B releasably held in their closed position by any suitable latching means 117 and pivotably mounted on the receiver as by hinges 118. The supporting surface 56 provided by the inner surface of the receiver bottom wall, in this modification, is shown schematically in FIG. 17 as pivotably mounted on structure 72 (such as the lugs 72 of FIG. 9) located at a fixed interval from the ground as by mounting on the chassis already shown. Means 64 such as the tilting means 64 of FIG. 9 are employed to move the supporting structure (of which only the bottom wall with surface 56 is shown in FIG. 17) between a position X in which its lower edge is in contiguity with the ground and in which the capsule is then unloaded and a position Y of less or zero slant, in which the capsule can conveniently be placed in position in the receiver of which the bottom wall forms a part. The rear end portion of the supporting structure 55 is thus variably spaceable from the ground. It will be noted that, in this modification, the supporting structure 55 is rigidly fixed relative to its rear end portion, no downwardly swinging door being employed.

Figures 18, 19, 20:
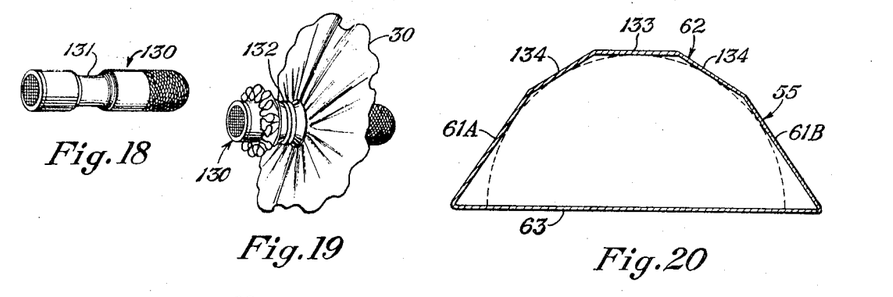
FIG. 18 is a perspective view of a form of relief valve.
FIG. 19 shows the relief valve in place for closing the front end of the capsule.
FIG. 20 is a cross-sectional view of a modification of the receiver.

Similarly, modifications may be made in the capsule; for example, the capsule forward end can be closed, after filling, by employing a one-way check valve 130 (FIG. 18) which is adapted for having material of the capsule sidewall open end fastened closely and sealingly about it by providing it with an elongated shell with an inlet end and outlet end. Secure fastening thereabout of the capsule material is facilitated by providing an annular, reduced diameter portion 131 intermediate the ends of the shell. Fastening can be effected, as shown in FIG. 19, by tying with wire or cord 132, etc. Also, the check valve 130 may be located in positions other than or in addition to the ends of the capsule.

FIG. 20 shows an alternate cross-sectional shape of the receiver 55 wherein the sidewalls 61A, 61B, as before, are generally tangent to a semicircle the diameter or base of which lies on the inner surface of the bottom wall 63 and which sidewalls lie at an angle to the bottom wall approximating the angle of repose of the chopped feedstuff to be deposited therein. The top wall 62 has a portion 133 which is approximately tangent to the semicircle and parallel to the base, which portion is connected to the sidewalls 61A, 61B by a pair of inclined portions 134, the angle of which to the bottom wall 63 is less than that of the sidewalls to the bottom wall. Each of these two portions 134 preferably comes into impingement upon a respective point of the periphery of the semicircle.

Figure 21:
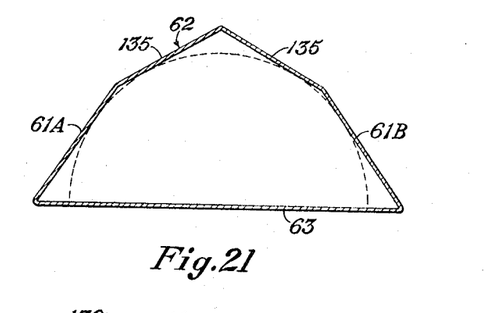
FIG. 21 is a similar view of another modification.

Another alternative cross-sectional shape of the top wall 62 is shown in FIG. 21 wherein the sidewalls 61A, 61B are angled as before and the top wall is formed in two mutually inclined portions 135, each of which preferably impinges on a respective point lying in the periphery of the semicircle. In each of the cross-sectional shapes of the receiver shown herein in FIGS. 20, 21 there is mutual, rearward divergence between the top and bottom walls 62, 63 as well as between the two, opposed sidewalls 61A, 61B; or, in the alternative, the top wall 62 is divided into separable portions as shown at 110A, 110B in FIG. 14. Either construction is employable in any of the receiver configurations shown; and, of course, both may be employed in a given construction where desired to give the ultimate minimum of binding between the capsule and receiver at time of discharge of the capsule.

Figure 22:
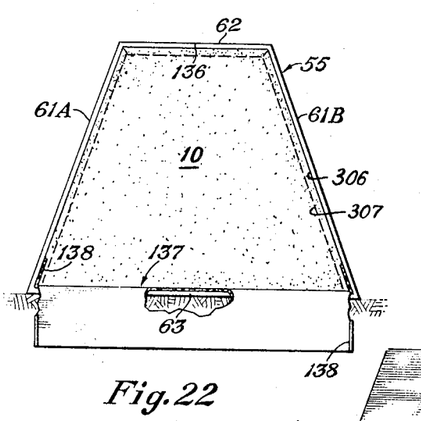
FIG. 22 is a rear end view of the bottom portion of a modification of the capsule in place in one of the receivers.

FIG. 22 illustrates an important modification of the device wherein the receiver 55 employs a construction generally similar to that already described. As shown, the top wall 62 may be divided, as at 136, into two portions laterally movable relative to each other, whereupon suitable means for clamping them together, as already described, are employed. Alternatively, or additionally, the top and bottom walls are rearwardly divergent from each other, as are the sidewalls. As a further alternative, any one of the receivers previously described is employed. Covering the inner surface of the bottom wall 63 is a capsule bottom wall 137 which has upturned side portions 138 that extend the length of and briefly upwardly along the sidewalls 61A, 61B. The side portions 138 preferably extend, as shown, to the end of the capsule bottom wall 137, which extends rearwardly of the receiver 55 far enough to permit its being grasped by a suitable clamp or equivalent and pulled, as by the stake and rope 65, 66 (FIG. 9) from the receiver 55 when the latter is in its unloading position. The capsule bottom wall 137 (FIG. 22) is made, for example, of a paper that is waterproofed and made gas-impervious by impregnating or coating it with a plastic or other suitable material. Because of the considerable strength of paper, for example, such pulling permits unloading the feed mass from the receiver at quite a shallow angle to the ground which, as in the case of the capsule 27 already described, often can be considerably less than the angle shown in FIG. 9. Before sliding the capsule bottom wall 137 (FIG. 22), hence the feedstuff mass 10 thereon, out of the receiver, the side and top walls 61A, 61B, 62 are moved away from the feedstuff mass as shown in FIG. 15; or, where diverging walls (as described) are employed, these permit the feedstuff mass to move rearwardly within the receiver.

As to the several-times mentioned concept wherein the top and bottom walls 62, 63 of the receiver are rearwardly divergent relative to each other, as are the two sidewalls 61A, 61B, FIG. 22 provides a somewhat schematic showing of an implementation of this concept wherein the receiver rear end opening is defined by the solid line 306 marking coincidence of the receiver inner surface with the rear edges of the walls 61A, 61B, 62, 63. The broken line 307 indicates the line of coincidence of the receiver inner surface with the forward edges of the walls 61A, 61B, 62 and cooperates with the forward edge of the lower wall 63 to define the receiver forward end opening. As shown, the forward opening is slightly smaller than the rear opening, the difference in sizes being occasioned by the above-mentioned wall divergences. While illustrated only in connection with the embodiment shown in FIG. 22, this same principle is applicable to the other receivers mentioned.

In filling the receiver 55 of FIG. 22, a finely chopped feedstuff is employed as already described, it being borne in mind that quite fine division of the feed is a factor influencing it to stand at a high angle of repose. This angle is also increased by cutting the feed when quite juicy or, if the plants have been allowed to become more mature, by spraying water or a liquid feed supplement into the feed as it is hurled into the receiver 55 by the chopper spout airstream. When the receiver 55 is sufficiently filled, it is unloaded by placing its rear edge (formed by the receiver bottom wall 63 or by the receiver door, not shown) in contiguity with the ground and holding the rear end of the capsule bottom wall in fixed position relative to the ground while the receiver, as in FIG. 9, is moved forwardly from under it. The relatively wet feedstuff on the capsule bottom wall 137 (FIG. 22), finely chopped and compacted into a mass by the force with which it is hurled into the receiver 55, retains its configuration during the unloading.

Figures 23, 25:
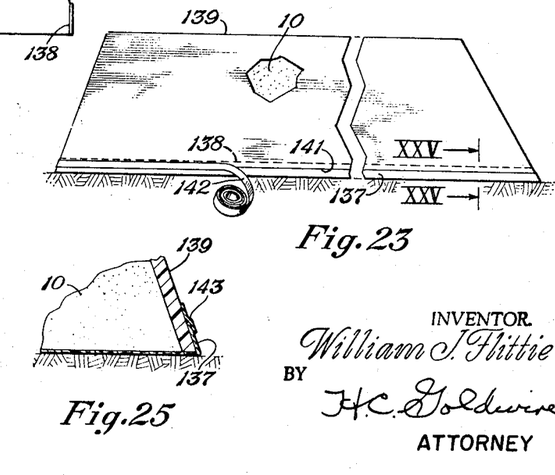
FIG. 23 is a side elevational view of the capsule bottom of FIG. 22 as assembled with the material for covering the top, sides, and ends of the feedstuff mass.
FIG. 25 is a fragmentary, cross-sectional view of a modification of the capsule taken as at line XXV–XXV of FIG. 23.
Figure 24:
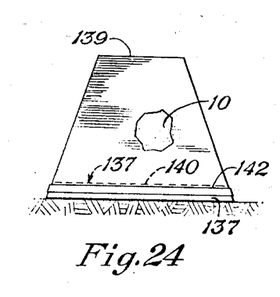
FIG. 24 is a front end elevational view of the capsule of FIG. 23.

With the feedstuff mass 10 on the ground, as in FIG. 23, the sides, ends, and top of the mass are covered with a thickness of a water- and gas-impervious material 139 and the upturned portions 138 of the paper or other material forming the capsule bottom wall are held up against the feedstuff mass in a position such as shown in broken line. The rear end material of the capsule bottom wall 137 is similarly moved upwardly and against the feedstuff, in the same manner as is extra material 140 (FIG. 24) at the front of the capsule. The feedstuff mass 10 thus is covered by an impervious, plastic material 139 having an edge 141 (FIG. 23) extending all around the mass near its bottom and overlapping the upturned borders of the bottom wall 137. The capsule is sealed as by applying an adhesive tape 142 which covers all the lower edge of the upper material 139 and extends sealingly onto the bottom wall 137, which of course can be made of any suitable water-proofed, gas-impervious material as an alternative to paper. On the other hand, the material covering the top and sides of the mass 10 also may be made of waterproofed, gas-impervious paper. A very thin plastic of around 2 millimeters in thickness is preferred, however, because of its low cost; and in a preferred embodiment of the material, is cut or moulded to a predetermined shape which fits the feed mass 10.

In a modification shown in FIG. 25, however, the material 139 is made of a relatively heavy plastic of 10 millimeter or even greater thickness. When using such a construction, it is most convenient to effect closure, as shown by placing the upper material 139 over the feedstuff mass, then folding the bottom wall 137 upwardly against it and effecting a seal between them with a tape 143.

In the modification shown in either FIG. 23 or FIG. 25, a one-way valve or other suitable means (such as a slit which is taped closed after fermentation is complete) is used to vent fermentation gases out of the capsule while preventing the entry of outside air. After fermentation, the capsule of either of these FIGS. is opened by removing the sealing tape 142 or by cutting or tearing the capsule. In the case of the construction of FIG. 25, the material 139 covering the top, sides, and ends of the feed is kept intact and saved for use again in following years; the thin upper material 139 of FIG. 23 is discarded.

Many aspects of the implementation and use of the method, and of the operation of the apparatus, have already been discussed, and only certain remaining aspects will be described below.

With references to FIG. 9, the tilting means 64 is ordinarily actuated to place the forward end of the receiver 55, during its transport into position in the field where it is to operate, even lower than the position shown. The capsule 27 then is placed in the receiver 55, and this is conveniently effected by inserting the capsule through the opening of the receiver at its front end and while the receiver is tilted to a large angle with the horizontal equaling or exceeding that shown in FIG. 10. In making such installation of the capsule 27, the receiver door 57 is first closed and locked as in FIG. 13, and the rear closure member 32 (FIG. 2) is inserted first into the receiver 55 and allowed to fall, a hold being maintained on the front end 31 of the capsule. As a result, the closure member 32 moves to the rear end of the receiver 55 FIG. 10), where it lies flat against the door 57 and, by its weight, tends to position and straighten the capsule sidewall 30 within the receiver. The excess material 94 at the capsule front end is turned back over the front end of the receiver 55 in the manner of a cuff, and the sleeve 93 and capsule clamping ring 95 are installed as described. Rungs 143 or equivalent are provided on the receiver 55 to facilitate access to the opening at its forward end. To avoid the imposition on it, while in the receiver 55, of unsupported forces tending to tear or burst it, the capsule 27 is so installed as to leave a degree of slack between its ends; and its circumference is somewhat greater than that of the interior of the receiver. With the receiver 55 in a preferred loading position, which often is approximately that shown in FIG. 10, the receiver is impelled through the field and relative to the feedstuff borne on the ground thereof by its own source of motive power, if such is provided, or by a tractor, etc. and in coordination with a machine which, as described, chops the feedstuff and deposits it in the capsule 27 as through a spout 60. The feed is preferably impelled by an airflow in which, as it leaves the spout 60, it is entrained, and its relative wetness and considerable velocity upon impact within the receiver 55 causes a degree of packing and coherence with other feedstuff particles which results in there being built up, within the capsule 27, a mass 10 (FIG. 11) in which the chopped feed has a rather high angle of repose. The kinetic energy of feed particles when they enter the capsule, and the increase of fluid pressure arising from the airflow within which they ordinarily are entrained, as well as the weight of the deposited particles, results in forces which tend to move the feedstuff radially outwardly relative to the capsule 27; and the latter is constrained, by the receiver 55 containing it, to a configuration in which the deposited feedstuff (since it then must conform to the capsule) forms an elongated mass having a substantially planar base coinciding with the lower, longitudinally extending side of the capsule, the latter being supported by the receiver bottom wall 63. The sides of the mass 10 slope inwardly from the base of the mass and are bounded by side portions of the capsule which are in turn supported by the spaced, elongated members provided by the receiver sidewalls 61A, 61B; thus the feedstuff mass has sides that, at substantially all locations thereon, lie at an angle which (upon regarding the planar base of the mass 10 as a reference horizontal) is between an angle approximating the angle of repose of the feedstuff and a lesser angle. Within limits already stated, however, the invention is still operative if it should happen that the angle of the sides of the mass 10 somewhat exceeds the angle of repose of the feedstuff. Similarly, the top of the mass 10 is shaped by the receiver top wall 62, acting through the support against outward forces it gives the capsule 27; thus, the sides of the mass are connected by a top of less slope, relative to the bottom of the mass, than the sides. The end of the capsule 27 is similarly constrained by the door 57 (FIG. 10) to a slope less than the angle of slide of the feedstuff, the receiver bottom wall upper surface 56 being taken as a reference horizontal. The receiver 55 is filled until the feed roughly forms a slanted plane which is parallel to and approximately level with that in which the forward edges of the walls of the receiver 55 lie; or the receiver is left somewhat less than completely full to allow for any downfalling of feed at its forward end upon the receiver being tilted to its unloading position.

The receiver 55 of FIGS. 14, 15, for example, is conveniently provided with a capsule 27 by placing the receiver in an approximately horizontal position and with the toggles 111 disengaged and swung on their pivots 114 to provide free access to the longitudinal opening thus provided, as shown in FIG. 15, between the top wall separable portions 110A, 110B.

The capsule 27 is placed in the receiver 55 through this opening, stretched out within the receiver, and its excess material 38 clamped on one of the top wall portions 110A or 110B by the spring clamps 115. The open front end of the capsule 27 is secured, as before, at the front end of the receiver 55 after the top wall relatively movable portions 110A, 110B are brought together by the toggles 111 to clamp material of the capsule 27 between them. If not already accomplished, the receiver door 57 is then locked in its closed position, and filling of the capsule 27 with the chopped feedstuff commences as above. The cheap, readily expendable capsule 27, when filled to a desired extent directly from the chopping machine as it moves through the field, it itself all that is needed to contain the feed for its fermentation and later feeding; thus, all the expense of machinery and labor for hauling the feed to a silo is saved, as is the cost of the silo itself, the machinery for conveying the feed into and out of it, and of feed troughs.

The filled capsule 27 preferably is closed at its front end, as described in connection with FIG. 6, while the capsule remains in the receiver 55, although this may be accomplished after depositing the capsule. Other closure means may also be employed, for example the means of FIGS. 18, 19; or the extra material of the capsule 27 at its front end may simply be tied shut by a cord, etc. as long as provision is made, as necessary, for venting fermentation gases while preventing entry of outside air into the capsule. Since the container 27 is sealed as soon as filled, the encapsulated feed is not subjected to the drying, exposure to bacteria, etc. it would encounter in the previously necessary intermediate hauling and handling incident to placing the feed in a silo.

The filled capsule 27 is placed on the ground in the spot where it becomes filled by lowering the receiver 55 to an angle at which the capsule preferably will not, of itself, slide. The door 57 then is opened to bring its upper edge 87, as in FIG. 9, into contiguity with the ground. The tilt of the receiver 55 is then increased enough to cause the capsule 27 to slide rearwardly until its rear end is in ground contact, and the receiver is moved forwardly from under it. In the preferred operation, however, the unloading angle is much reduced (for example, to considerably less than that shown in FIG. 9) by employing a pulling means such as the stake 65 and rope 66 attached to the capsule 27 as already described. A similar procedure is employed for unloading the filled capsule 27 from the other disclosed modifications of the receiver; for example, the receiver of FIGS. 16, 17 is unloaded by tilting it to an angle in which its rear end is in ground contiguity, then opening the doors 57A, 57B and allowing the capsule to slide to the ground under influence of gravity and/or a pulling force applied as already described. The modification of FIGS. 14, 15 is unloaded similarly to that of FIG. 9; before rearward motion of the capsule 27 relative to the receiver 55 is effected, the toggles 111 are loosened and the sidewalls 61A, 61B laterally spaced from each other to take them and the top wall portions 110A, 110B out of contact with the capsule. Also, the extra capsule material 38 is freed beforehand by opening the clamping devices 115. In all modifications, it must be borne in mind that the capsule 27 has a bottom, longitudinally extending side along all its major dimension, and that that side is made of a relatively thin and fragile material which would be immediately subject to rupture upon the filled capsule being supported while any significant area of its bottom side is deprived of support. Virtually continuous and uninterrupted support is provided to all the bottom side of the capsule 27 during its transition, as described above, between the receiver 55 and the ground; with relative motion between the capsule and the supporting surface provided by the receiver to bring the capsule rear end into ground contact, an initial part of the capsule comes to rest on the ground without ever having experienced lack of support, having at all times received such support from either the receiver or ground. Moving the receiver 55 forwardly and from under the capsule 27 continuously increases the ratio of the bottomside portion of the capsule supported by the ground to the portion still supported by the upwardly facing surface of the receiver until all the capsule is ground supported. Rupture of the bottom of the capsule 27 thus is prevented. Since the sides and ends of the feedstuff mass 10 are at an angle to the ground which approximates the angle of repose of the feed, the mass substantially retains the shape imposed upon it by the receiver 55, and rupture of the relatively fragile capsule 27 by downfalling of feed is avoided. The same results are obtained in unloading the filled receiver 55 when employing the capsule bottom 137 shown in FIG. 22, although the capsule preferably is not completed (as shown in FIGS. 23—25) until after unloading is accomplished.

The use of a number of individual capsules 27 makes it possible for one man to accomplish the entire silaging operation in leisurely fashion without danger of drying or other deterioration of feed before filling and closing of a silo. If desired in order to vary the characteristics of the resulting feed or simply as a matter of convenience, it is readily possible to cut the crop at varying degrees of maturity and/or to vary the depth of cut below the seed-heads of milo maize, etc.

When the filled capsule 27 has been placed on the ground, its interior is soon purged of fresh air by the large volumes of fermentation gases (largely of carbon dioxide) which soon evolve. These gases are vented as described, and prevention of the entry of air into the capsule 27 obviates secondary bacterial actions which otherwise would result in the formation of a slimy, spoiled layer such as forms in the top portion of feed in a silo; consequently, the general palatability and nutritiousness of the resulting silage is excellent. Distending of the capsule 27 by fermentation gases reduces wind whippage of the capsule material and allows it to yield readily and thus escape puncture from hail; freedom from hail damage is subsequently provided by the yielding support given the capsule material by the silage after fermentation has subsided. Complete protection of its contents from water, dust, etc., is provided by the capsule 27. Similar protection of its contents, and freedom from hail damage is provided by the capsules shown in FIGS. 23—25.

When the animals to be fed on the silage thus produced are brought into the field, the only labor essentially needed to make the feed available to them is that required for opening successive capsules as the feed therein is needed for consumption. By slitting or removing only its top, a capsule forms a clean and convenient feeding trough; after the feed is all consumed, the capsule is discarded. If its top portion is made of a heavier material as shown in FIG. 25, however, this portion may be stored for successive reuses in later years. In either case, the expenses of a silo, and of the labor and machinery for filling it, are avoided. While a silo and such machinery can only be depreciated, for tax purposes, over an applicable number of years, a disposable capsule is immediately deductible from gross income, for all its cost, in the year of use.

Since the silage is fed, in the spaced locations where the capsules become filled and unloaded, on the very ground where the silage was produced, no separate feedlot is necessary. A given area of ground experiences a sustained, high concentration of the fed animals for only several days, hence is not injured; and the relatively even distribution of all the elimination products of the animals over all the field is highly beneficial to the land and is obtained at no cost. A further result is that the animals have clean and attractive feeding and living conditions which maintain their healths and appetites, and little or no antibiotics, etc. need be introduced into their feed. Meanwhile, if feed supplements are desired, these are readily introduced at the time of depositing the feed in the capsule, or such introduction is accomplished by placing the supplements on the finished silage after each capsule is opened. The combination of healthful feeding conditions and a feed of superior palatability and food value results in maximum assimilative powers and gain of the animals fed. Since the capsules are opened in coordination with the nutritional demand of the group of animals fed, there is no spoilage and consequent wastage of the feed; and all the heavy labor and expense of removing feed from a silo and transporting it to feed troughs is saved, as is the labor and expense of storing and feeding grain and fodder.

The invention offers especially important economic advantage to farmers in the subhumid areas of this and other countries, i.e., areas without consistently sufficient rainfall to ensure good yields of corn, but with rainfall sufficient to produce profitably other feed crops, notably milo maize. Since these areas are large relative to the areas of high corn production, and since it is in them that much of the feeder livestock animals production takes place, the livestock thus are readily on hand for feeding. Upon resolving uncertainties and variables in favor, in each instance, of the higher figure, the 1966 cost per animal being fattened, to a farmer employing the present invention, is no more than 25 cents per day, the elements of such cost including land taxes, plowing, seeding, cultivation or equivalent, fertilizer, harvesting into the capsule or container, and feed supplements, this where a 30-bushel per acre milo maize crop is produced. (In some areas, a 60-bushel crop is reliably produced.) Feeding 700-pound yearling cattle over 150 days with a normally good weight gain of 2¼ pounds per day, and with a sale price for finished beef animals of $22/100 after a purchase price for feeders of $20/100, the net on each animal is $59 per head, or approximately $40 per acre of the land on which the crop was produced. By contrast, a farmer selling only the seed from the same crop, at a price consistent with the beef prices noted above, could expect a net return of only $13 per acre. In further contrast, the cost of feeding cattle in a commercial feedlot is not less than 50 cents per animal per day. Thus, the operator of even a one-man farm is enabled, by the invention, to fatten cattle at a price giving him a greatly superior competitive advantage over a commercial feedlot operation. Meanwhile, since milo maize (for one example) is a highly reliable crop under year-to-year changes in weather conditions, the income of the farmer is not only greatly improved, but is stabilized. At the same time that his security and economic independence are increased, he is enabled to place into commerce an increased quantity of high quality meat animals at lower prices, thus providing needed benefit to the ultimate consumer.

While only one embodiment of the apparatus of the invention, together with modifications thereof, has been disclosed herein, it will be evident that still other modifications are possible in the arrangement and parts of its components without departing from the scope of the invention.

I claim:

1. A capsule for ensilaging a fresh, chopped feedstuff plant material, said capsule comprising:
   a closure member made of a semirigid, substantially gas-impervious material and having a face area defined by a substantially flat lower border, side borders extending upwardly in mutual convergence, and a top border connecting the side borders, the angle of each side border to the lower border approximating the angle of each repose of the chopped material;
   a tubular sidewall expansible to have a cross-sectional area substantially larger than and shaped in general correspondence to the closure member face area and having an open end and a rear end firmly attached to and closed by the closure member, the tubular sidewall being made of a substantially gas-impervious material a plurality of times thinner and more flexible than the closure member; and
   means for closing the tubular sidewall open end, after the capsule is filled to a desired extent with the freshly chopped, feedstuff plant portions, to prevent the entry of air into the capsule.

2. The capsule of claim 1, the tubular wall having a top side, the capsule further comprising means lightly closing off from the capsule interior a portion of the tubular wall extending longitudinally of the capsule.

3. The capsule of claim 1, further comprising:
   at least one reinforcing element firmly attached to and extending substantially the length of the tubular sidewall; and
   connecting means rearwardly located relative to the capsule and firmly attached to the at least one reinforcing element, whereby a pulling force may be applied to the capsule through the connecting means and at least one reinforcing element to urge rearward sliding of the capsule.

4. The capsule of claim 1, the means for closing the tubular sidewall comprising:
   a rigid ring enclosing an area smaller than the closure member face area and having a peripheral face with a peripheral groove formed therein, the ring being adapted for having brought into said groove a portion of the tubular sidewall having a surface area extending around all the periphery of the tubular sidewall;
   a plate formed from a substantially gas-impervious material and having a peripheral flange which complements the ring peripheral face and is adapted to slip over the latter while said surface area of the tubular sidewall is in the groove; and
   means adapted for compressing the peripheral flange against said portion of the tubular sidewall to bring said surface area into close, fixed contact with the ring.

5. The capsule of claim 4, the plate having an opening therethrough adapted for attaching to the plate a valve providing one-way passage of gases from the interior to exterior of the capsule.

6. A receiver for receiving thereinto an inflow of chopped vegetable feedstuff particles and for constraining the same jointly to assume a predetermined configuration as they accumulate in the receiver to form a mass,
   said receiver being of tubular configuration and comprising of a pair of mutually spaced sidewalls, a top wall, and a bottom wall free of downwardly extending convexity, said walls being elongated and connected together to surround a volume and each having forward and rear edges and the receiver further having means for closing one of its ends during deposition therein of the feedstuff, and
   The sidewalls being connected to the bottom wall and sloping upwardly and inwardly therefrom and toward each other at an angle to the bottom wall approximating the angle of repose of the chopped feedstuff.

7. The receiver of claim 6, the sidewalls forming approximate tangents to a semicircle the diameter of which is approximately in register with the bottom wall inner surface and the top wall having an inner surface approximately following the arc of the semicircle remaining above the points of tangency of the sidewalls with the semicircle.

8. The receiver of claim 6, there being rearward divergence between the top and bottom walls and between the sidewalls.

9. The receiver of claim 6, the top wall being longitudinally divided into at least two portions movable relative to each other to form and to close an opening through the top wall extending longitudinally of the receiver.

10. The receiver of claim 9, the sidewalls being elastically yielding for permitting said relative motion between the at least two portions of the top wall.

11. The receiver of claim 6, the top wall being flat and having an inner surface approximately parallel to the bottom wall.

12. The receiver of claim 6, the sidewalls being connected by the top wall and the top wall having a plurality of planar portions each lying at a lesser angle to the bottom wall than the angle of either of the sidewalls to the bottom wall.

13. The receiver of claim 6, said receiver having a forward rim formed by the forward edges of its walls and defining a front opening lying in a surface all parts of which are inclined relative to the bottom wall at an angle approximating the angle of repose of the fresh, chopped feedstuff, the receiver further having a rear rim formed by the rear edges of its walls and defining a rear opening lying in a surface all parts of which are at an angle to the bottom wall less than the angle of repose of the fresh, chopped feedstuff, the receiver still further having movably mounted thereon means for closing the rear opening.

14. The receiver of claim 6, the width of the bottom wall being approximately twice the feeding reach, from its front feet, of a representative one of the animals to which the feedstuff is to be fed.

15. The receiver of claim 6, said receiver being provided with means for its pivotal mounting on means for transporting the receiver.

16. The receiver of claim 6, said receiver having, in the vicinity of the forward edges of its walls, means for holding the mouth of a capsule, upon the capsule being placed in the receiver, in position for receiving into the capsule any inflow of chopped feedstuff directed into the receiver.

17. The receiver of claim 6, the inner surface of at least the bottom wall being smooth.

18. The receiver of claim 6, said means for closing one of the receiver ends being a door moveable between a first position in which it closes said at least one end of the receiver and a second position in which it has an edge spaced from the receiver and an upper surface which is smoothly continuous with the inner surface of the receiver bottom wall.

19. The receiver of claim 6, said means for closing one of the receiver ends comprising at least one door pivotable on the receiver.

20. The receiver of claim 6, said means for closing one of the receiver ends being a pair of doors laterally pivotable on the sidewall rear edges between a first position in which their distal edges substantially meet and a second position in which the associated one of the receiver ends is unobstructed by the doors.

21. In combination with the receiver of claim 6, an elongated sheet substantially covering the receiver bottom wall and so positioned within the volume surrounded by the receiver walls as to lie between the receiver bottom wall and said inflow of chopped vegetable feedstuff into the receiver.

22. The elongated sheet of claim 21, said sheet extending rearwardly from the bottom wall rear edge.

23. The elongated sheet of claim 21, said sheet having upturned, lateral edge portions, each edge portion extending upwardly relative to the receiver bottom wall and adjacent a respective receiver sidewall.

24. In combination with the receiver of claim 6, a tubular, flexible, substantially gas-impervious container housed in the receiver and having a volume, when filled, at least as great as said volume surrounded by the enclosure walls, the container having a mouth positioned for receiving into the container any inflow of chopped vegetable feedstuff into the receiver.

25. Means for encapsulating and ensilaging a freestanding mass of chopped, fresh feedstuff plant material of predetermined size and shape and to be fed to animals, said means comprising:

means for receiving and lying beneath the feedstuff mass, said means comprising an elongated sheet forming a bottom wall and having flexible margins extending outwardly beyond and encompassing said predetermined size and shape;

means for cooperating with the bottom wall to encapsulate the feedstuff mass and comprising a sheet having edges free of connection with the bottom wall during reception of the feedstuff mass thereon and thereafter moveable into a position in which the sheet covers the feedstuff mass and the sheet edges are in overlapping relation with the bottom wall margins when the latter are turned upwardly and adjacent the feedstuff mass; and means for sealing the sheet edges to the bottom wall all around the feedstuff mass, whereby the mass is substantially isolated from air outside the capsule thus formed by the sheet and bottom wall and the sheet and bottom wall being air -and water-impervious.

26. The means named in the preamble of claim 25, the bottom wall being of a material a plurality of times stronger than the sheet.

27. The means named in the preamble of claim 25, the sheet being a thin plastic material preshaped to fit the feedstuff mass.

28. The means named in the preamble of claim 25, the sheet being formed of a material thicker than the bottom wall and preshaped to fit the feedstuff mass.

29. The means named in the preamble of claim 25, the bottom wall being of a width approximately twice the feeding reach, from its front feet, of a representative one of the animals to which the ensilaged feedstuff is to be fed.